United States Patent
Nakanishi et al.

(10) Patent No.: US 6,913,852 B2
(45) Date of Patent: Jul. 5, 2005

(54) BATTERY MODULE AND CONTAINER FOR BATTERY MODULE

(75) Inventors: Naoya Nakanishi, Tondabayashi (JP); Kouichi Satoh, Itami (JP); Yoshito Chikano, Katano (JP); Kazunari Ohkita, Moriguchi (JP); Ikuo Yonezu, Hirakata (JP); Koji Nishio, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/261,782

(22) Filed: Oct. 2, 2002

(65) Prior Publication Data

US 2003/0031921 A1 Feb. 13, 2003

Related U.S. Application Data

(62) Division of application No. 09/799,034, filed on Mar. 6, 2001, now Pat. No. 6,645,664, which is a division of application No. 09/272,571, filed on Mar. 19, 1999, now Pat. No. 6,270,920.

(30) Foreign Application Priority Data

Mar. 19, 1998 (JP) ........................................... 10-070003
Mar. 19, 1998 (JP) ........................................... 10-070004

(51) Int. Cl.[7] .......................... H01M 2/10; H01M 10/50
(52) U.S. Cl. ........................ 429/99; 429/100; 429/120; 429/159; 429/163; 429/176
(58) Field of Search .............................. 429/96–100, 20, 429/149, 156, 176, 186, 163, 120, 159, 151, 164, 179, 7

(56) References Cited

U.S. PATENT DOCUMENTS

| | | | | |
|---|---|---|---|---|
| 989,738 A | * | 4/1911 | Waterbury et al. ............. | 429/99 |
| 1,546,422 A | * | 7/1925 | Whitehead ..................... | 429/99 |

(Continued)

FOREIGN PATENT DOCUMENTS

| | | | | |
|---|---|---|---|---|
| JP | 57-117071 | 7/1982 | | |
| JP | 62-34758 | 2/1987 | | |
| JP | 5-68071 | 9/1993 | | |
| JP | 6-203823 | 7/1994 | | |
| JP | 07-005877 | 1/1995 | | |
| JP | 08-87994 | 4/1996 | | |
| JP | 08-241730 | 9/1996 | | |
| JP | 08-250087 | 9/1996 | | |
| JP | 9-86188 | 3/1997 | | |
| JP | 09-086188 | 3/1997 | | |
| JP | 09-188778 | 7/1997 | | |
| JP | 09199167 A | * | 7/1997 | .......... H01M/10/39 |
| JP | 10-27591 | 1/1998 | | |
| JP | 10-021891 | 1/1998 | | |
| JP | 10021891 A | * | 1/1998 | ............ H01M/2/10 |
| JP | 10-022806 | 1/1998 | | |
| JP | 10-188926 | 7/1998 | | |

*Primary Examiner*—Gregg Cantelmo
(74) *Attorney, Agent, or Firm*—Armstrong, Kratz, Quintos, Hanson & Brooks, LLP

(57) ABSTRACT

A battery module has a plurality of electrically connected unit cells fixed in a container. A buffer member is provided at the void between the inner wall of the container and the unit cell. By virtue of the buffer member in the battery module formed of a heat conductive elastic body, the requirement of vibration resistance can be met by the buffer member while the heat generated by the unit cell can be easily discharged via the buffer member. Thus, a battery module suppressed in degradation of the performance of the unit cell caused by heat can be provided.

1 Claim, 4 Drawing Sheets

U.S. PATENT DOCUMENTS

| | | | | |
|---|---|---|---|---|
| 2,740,824 A | * | 4/1956 | Stanimirovitch | 429/120 |
| 2,745,893 A | * | 5/1956 | Chubb et al. | 429/220 |
| 4,029,855 A | * | 6/1977 | Dougherty et al. | 429/82 |
| 4,407,911 A | | 10/1983 | Hooke | |
| 4,443,523 A | | 4/1984 | Hasenauer | 429/99 |
| 5,300,125 A | | 4/1994 | Desai et al. | |
| 5,354,630 A | | 10/1994 | Earl et al. | |
| 5,736,272 A | | 4/1998 | Veenstra et al. | 429/99 |
| 5,763,116 A | * | 6/1998 | Lapinski et al. | 429/99 |
| 5,977,746 A | | 11/1999 | Hershberger et al. | 320/112 |
| 6,004,689 A | | 12/1999 | Walker et al. | 429/53 |
| 6,007,937 A | | 12/1999 | Ruiz Rodriguez et al. | 429/94 |
| 6,051,336 A | | 4/2000 | Dougherty et al. | 429/149 |

\* cited by examiner

BATTERY MODULE AND CONTAINER FOR BATTERY MODULE

This application is a divisional application of application Ser. No. 09/799,034 filed Mar. 6, 2001 now U.S. Pat. No. 6,645,664, which is a divisional application of application Ser. No. 09/272,571 filed Mar. 19, 1999, now U.S. Pat. No. 6,270,920.

BACKGROUND OF THE INVENTION

1. Field of the Invention

The present invention relates to the structure of a battery module having a plurality of cells electrically connected, and a container for a battery module. Particularly, the present invention relates to the structure of a battery module improved in vibration resistance and heat resistance and a container thereof suitable as a battery module for electric vehicles having a large lithium secondary battery, for example, electrically connected.

2. Description of the Background Art

A battery module having a group of a plurality of unit cells electrically connected is conventionally known. Various types of battery modules with different voltages and capacities in addition to the supplemental function of displaying the remaining capacity and the like are produced in order to correspond to various applications, and are now available on the market as a portable power supply.

The unit cell forming the battery module has a structure in which a collector piece is welded to the current collector. Upon exertion of vibration, the collector piece fixed by welding will receive stress to result in fraction of the collector piece itself or the weld portion thereof.

Electric vehicles are recently known as the new application for a battery module. Since the battery module for an electric vehicle is generally used in the situation where vibration is constantly exerted, there is the need of improving the poor vibration resistance arising from the internal structure of the unit cell. There is also the heat radiation demand for a structure that discharges outside the heat generated from the unit cell in order to prevent increase in the temperature of the unit cell that becomes the cause of degrading the unit cell performance.

Japanese Patent Laying-Open No. 6-203823, for example, discloses a battery developed to accommodate the aforementioned need of improving the vibration resistant property. According to the technique disclosed in this publication, the structure of the interior of the unit cell is modified. The power generation member is held elastically within the unit cell by connecting the current collector and the collector piece by means of compression. The problem of stress being exerted on the collector piece that is fixed by welding when vibration occurs to result in fracture is solved. However, this method by compression connection requires the component and the procedure of fabricating a unit cell to be partially modified since modification of the internal structure of the unit cell is indispensable.

Although vibration resistance is improved in the unit cell according to the compression connection method, resistance at the connecting section increases since the connection between the collector piece and the current collector is not electrically sufficient in comparison to the connection by the conventional welding method. As a result, the voltage drop is great when a great current is discharged. Problems will be encountered in the battery characteristics such as reduction in the cell capacity. Thus, there was a problem that a battery module using unit cells according to such a method is degraded in performance than a battery module using conventional cells.

As another approach of accommodating the demand for vibration resistance, a structure of buffering the vibration by securing the unit cell in a container using rubber is generally known. Although vibration resistance is improved by the secure structure using rubber, degradation in the performance of the unit cell caused by the heat generated from the charge/discharge of the unit cells in the battery module cannot be suppressed since the heat dissipation ability of rubber is low.

Therefore, when improvement in vibration resistance is required in a battery module of the conventional type, the unit cell per se had to be modified. Furthermore, when a great current is to be output from this cell, the voltage drop will increase to reduce the capacity of the unit cell since the internal resistance is high. There was a problem that a battery module using such unit cells has low performance.

As a technique of improving the heat radiation property of a battery module, Japanese Patent Laying-Open No. 9-86188 discloses the art of cooling a unit cell that generates heat in response to the charge/discharge by providing a hole in the container for cooling.

However, for a battery module formed of a plurality of unit cells according to such a conventional structure, the difference in temperature between the outer side unit cell located outside in the proximity of the hole for cooling and the inner side unit cell located further away from the hole could not be suppressed sufficiently. Difference in temperature between the unit cells in a battery module will result in different conditions for the charge and discharge in respective unit cells. The capacity of each of the unit cells in the battery module will differ to degrade the essential performance of the battery module.

SUMMARY OF THE INVENTION

In view of the foregoing, an object of the present invention is to provide a high performance battery module that allows improvement of vibration resistance and that suppresses degradation of the performance caused by the heat generated from the unit cell without modifying the internal structure of a conventional unit cell.

Another object of the present invention is to provide a battery module suppressed in the adverse effect caused by variation in the temperature of the unit cells within the battery module.

According to an aspect of the present invention, a battery module includes a plurality of electrically connected unit cells fixed in a container, and a buffer member at a void between the inner wall of the container and the unit cell.

According to the battery module of the above structure, the requirement of the vibration resistant aspect can be met by the buffer member in the battery module being a heat conductive elastic body while the heat generated from the unit cell can be easily discharged via the buffer member. Therefore, a battery module suppressed in degradation of the performance of the unit cell caused by heat can be provided. In accommodating the needs of both vibration resistance and heat dissipation, the internal structure of the unit cell does not necessarily have to be modified. There is an advantage that the component and procedure of fabricating a unit cell do not have to be modified.

In the battery module of the present invention, the buffer member preferably has metal particles mixed in rubber.

Accordingly, the shape of the buffer member can be selected arbitrarily. Therefore, a battery module that can easily be applied to the currently available battery module and suppressed in modification cost can be provided.

By using metal particles including aluminum or copper to be mixed into the rubber forming the buffer member, the heat generated at the unit cell can be conveyed to the container efficiently. Therefore, reduction in the performance caused by the heat of the unit cell can be suppressed. Since these materials are relatively economical and easily available, the cost of the buffer member can be lowered.

The material of the rubber forming the buffer member preferably includes one or more of the material of styrene rubber, butadiene rubber, styrene butadiene rubber and urethane rubber. These materials are advantageous in that aggregation of the metal particles does not easily occur since the materials are miscible with the metal particles in addition to having the property sufficient for a buffer member. By mixing metal particles into these rubber materials, a buffer member of uniform property can be obtained. Thus, a battery module stable in quality can be provided.

The thickness of the buffer member is preferably 2–15 mm. By selecting such a range of thickness for the buffer member, a buffer member that has sufficient heat dissipation effect with small volume can be obtained. If the thickness is less than 2 mm, the property as a buffer member is not sufficient. If the thickness is greater than 15 mm, the effect of heat dissipation is reduced, and the energy density for the battery module will degraded. By virtue of the present invention, a battery module of high energy density using a buffer member of small volume can be provided.

According to an aspect of the present invention, a container of the battery module of the present invention accommodates a plurality of unit cells in an electrically connected state. A buffer member is provided between the inner wall of the container and the stored unit cell. The buffer member is formed of a heat conductive member.

According to the battery module container of the above structure, the heat generated by the unit cell can be discharged efficiently through the buffer member in the state where the unit cells are stored in the container.

According to another aspect of the present invention, a battery module includes a plurality of unit cells, a container in which the unit cells are stored, and a plurality of cell secure plates having a void formed into which the unit cell is inserted to fixedly hold the unit cell inserted in the void within the container. The cell secure plate is made of metal.

When the cell generates/absorbs heat by the charge/discharge in the battery module of the above structure, variation of cooling for the unit cells is suppressed by the heat conductivity of the cell secure plate formed of metal. The difference in temperature occurring between the unit cells can be reduced. Thus, a high performance battery module suppressed in difference between the property of respective unit cells can be provided.

In the battery module, the cell secure plates are installed at an interval of not more than ⅓ the length of the unit cell. By setting such an installation distance between the cell secure plates, a battery module suppressed in variation in temperature of respective unit cells can be provided.

In the battery module, the cell secure plate and the unit cell are preferably connected with a heat conductive resin. Such a connection allows the heat generated at the cell to be reliably conveyed to the cell secure plate. Since the cell secure plate and the outer side of the cell are in close contact, each cell can be reliably fixed.

In the battery module, the cell secure plate is formed of a punching metal having a porosity of 30–70%. By using such a material for the cell secure plate, the weight of the battery module can be reduced without degrading the strength. A battery module of high energy density per unit weight can be provided.

From the standpoint of improving the cooling efficiency, the cell secure plate is installed in a slanted manner with respect to the plane perpendicular to the longitudinal direction of the unit cell.

According to a further aspect of the present invention, a container for the battery module of the present invention has a void formed in which a plurality of unit cells are inserted to store the unit cells in an electrically connected state. A plurality of metal cell secure plates are provided to fixedly hold the unit cells within the container of the battery module with the unit cells inserted in the void.

According to the container for the battery module of the above structure, generation of difference in the temperature between the unit cells can be suppressed by the heat conductivity through the metal cell secure plate in the state where the unit cells are stored in the container. Since variation in the property of the unit cells can be suppressed, the performance of the battery module can be improved. The cell secure plate formed of metal is not easily deformed with respect to external stress. Therefore, the mechanical strength of the battery module can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A first embodiment of the present invention will be described hereinafter with reference to FIGS. 1–5.

Figure 1:
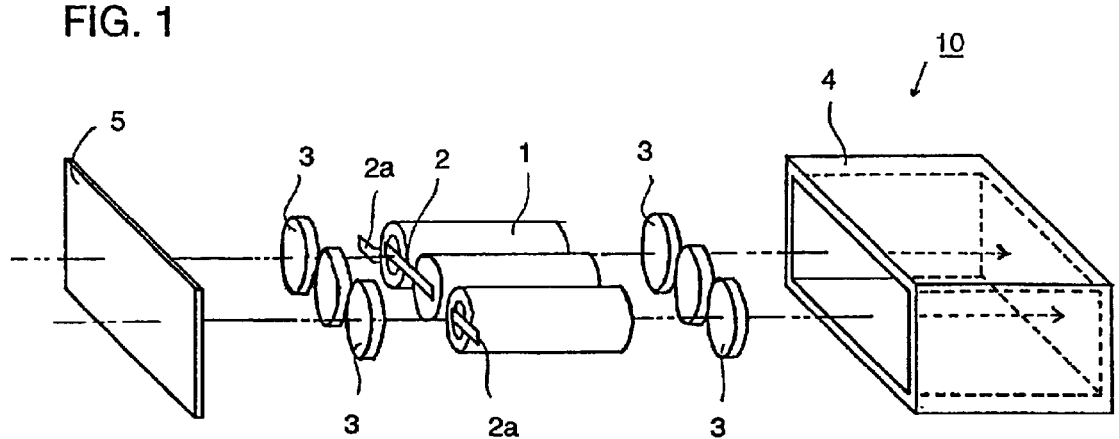
FIG. 1 is an exploded perspective view of a battery module according to a first embodiment of the present invention.

Referring to FIG. 1, a battery module of the first embodiment includes a container 4 made of resin to accommodate the battery module, a plurality (three in the drawing) of unit cells 1, a buffer member 3, and a resin container lid 5.

A plurality of unit cells 1 are arranged substantially parallel and are connected to each other at the face of ends in the longitudinal direction thereof by a cell connection piece 2. The plurality of unit cells 1 are electrically connected in series. Buffer member 3 is arranged at each face of both ends of each electrically connected unit cell 1. The plurality of cell units 1 are stored within container 4 to which lid 5 is fitted. Thus, a battery module 10 is produced. Buffer member 3 is formed of styrene rubber in which 30% by weight of aluminum particles having a grain size of 50 $\mu$m–100 $\mu$m are mixed.

A current lead out terminal 2a from which current is output is connected to unit cells 1 located at respective sides of the plurality of unit cells 1 in container 4. Current lead out terminal 2a protrudes outside lid 5 to allow current to be output from the battery module.

Figure 2:
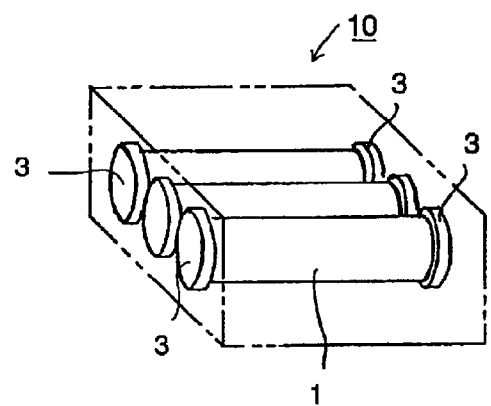
FIG. 2 is a perspective view showing a structure of the battery module of the first embodiment of the present invention.

FIG. 2 shows the battery module of the first embodiment in a completed state, i.e., buffer member 3 placed at each of electrically connected unit cells 1, inserted and held within container 4 with lid 5 on.

Figure 3:
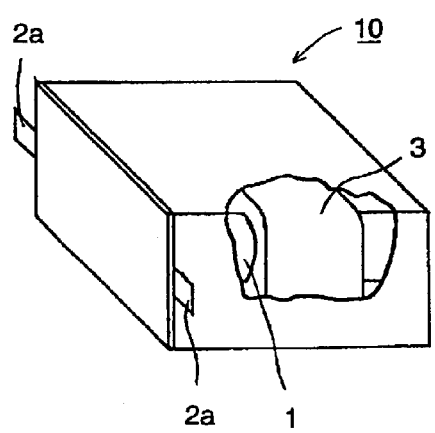
FIG. 3 is a partially broken view showing a modification of the structure of the battery module of the first embodiment.

FIG. 3 is a partial broken perspective view of a modification of the battery module of the present embodiment. The battery module of FIG. 3 differs from the battery module of FIGS. 1 and 2 in that buffer member 3 is provided continuously so as to enclose the outer perimeter side face of each unit cell 1. By providing buffer member 3 at the outer perimeter side of unit cell 1, the vibration resistance with respect to the vibration perpendicular to the longitudinal direction of unit cell 1 is improved. Also, degradation of the unit cell is suppressed since the heat generated at the unit cell is dissipated efficiently by the heat conduction through the buffer member. A battery module of high performance is allowed.

Fabrication of a unit cell and module of a battery module according to the present embodiment will be described hereinafter. Also, the advantageous effect of the present embodiment will be described according to experiments carried out on an Inventive Sample 1 and a Comparative Sample 1 of a completed battery module.

[Fabrication of Inventive Sample 1]

A cathode plate with aluminum foil as a current collector using $LiCoO_2$ as the cathode active material and an anode plate with copper foil as a current collector using graphite as the anode active material were wound spirally several times with a porous film of ion permeable polyolefin therebetween to form an electrode group body. The electrode group was inserted into a battery can together with an ester type organic electrolytic solution that includes $LiPF_6$ 1M in concentration as the support electrolyte to produce a 250 Wh class lithium secondary battery of $\Phi$65×300 mm as unit cell 1.

Three unit cells 1 formed as described above were juxtaposed substantially in parallel and connected in series with a connection piece 2. A buffer member 3 of 14 mm in thickness formed of styrene rubber including 30% by weight of aluminum particles having the grain size of 50 $\mu$m–100 $\mu$m was arranged at the face of both ends in the longitudinal direction of electrically connected unit cell 1. Unit cells 1 and buffer members 3 were sealed in a receptacle of container 4 and lid 5 to fabricate a battery module as Inventive Sample 1 of the present invention.

[Comparative Sample 1]

A battery module was fabricated as Comparative Sample 1 for comparison in performance with the above battery module 10 (Inventive Sample 1). The battery module of Comparative Sample 1 was fabricated likewise Inventive Sample 1 except for the usage of a buffer member 3 formed only of styrene rubber with no metal particles mixed therein. The following Experiments 1–3 to test the performance of the above Inventive Sample 1 and Comparative Sample 1 were carried out.

(Experiment 1)

The relationship of the material of the buffer member with respect to the discharge capacity of the battery module and the unit cell temperature was studied. As Experiment 1, respective battery modules differing in the material of the buffer member were subjected to a vibration test under the following condition. The charge/discharge test was carried out under the following conditions before and after this vibration test.

As the charge/discharge test, the battery module was placed in a thermostat of 25° C. The battery module was charged at 8.75 A until the voltage of the battery module became 12.3V. Then, discharge was effected at 70 A until the voltage of the battery module became 8.1V. The temperature of the battery was measured by a thermocouple attached at the side face of the center unit cell. The highest achieved temperature at the time of discharge was recorded as the discharge highest temperature.

As a vibration test, the battery module was secured to the sample fix unit of the vibration tester with the unit cells in a lateral position at room temperature. Vibration of 100 Hz in frequency and 4 cm in amplitude was applied for one hour in the lateral direction of the unit cell.

Then, a charge/discharge test was carried out according to the above method to detect the capacity after the vibration test.

Table 1 shows the result of the vibration test, i.e., the discharge capacity of the battery modules differing in the material of the buffer member before and after the vibration test. The values in Table 1 indicate that charge/discharge is allowed even after the vibration test for both battery modules. Equal discharge capacity was exhibited irrelevant to whether metal particles are included or not. It is therefore appreciated that there is no problem using a buffer member in which metal particles are mixed.

TABLE 1

| | Before vibration test (Ah) | After vibration test (Ah) |
|---|---|---|
| Inventive Sample 1 | 70 | 68 |
| Comparative Sample 1 | 70 | 68 |

The following Table 2 shows the result of the charge/discharge test, i.e., the discharge highest temperature before and after the vibration test in battery modules differing in the material of the buffer member. It is appreciated from Table 2 that the temperature of the unit cell is lower when the buffer member includes metal particles than when formed solely of rubber. This effect was present both before and after the vibration test.

TABLE 2

| | Before vibration test (° C.) | After vibration test (° C.) |
|---|---|---|
| Inventive Sample 1 | 40 | 40 |

TABLE 2-continued

|  | Before vibration test (° C.) | After vibration test (° C.) |
|---|---|---|
| Comparative Sample 1 | 60 | 60 |

(Experiment 2)

The relationship between the material of the buffer member and the charge/discharge cycle property of the battery module was studied. As the experiment, a charge/discharge cycle property test was carried out under the following conditions using the battery modules of Inventive Sample 1 and Comparative Example 1 differing in the material of the buffer member.

The battery module was placed in a thermostat of 25° C. The cycle of charging the battery module at 8.75 A until the voltage of the battery module becomes 12.3V and then discharging at 70 A until the voltage of the battery module becomes 8.1V was repeated 100 times for the charge/discharge cycle property test. The cycle property value is the ratio of the discharge capacity after the 100 cycles to the initial discharge capacity in the charge/discharge cycle.

Figure 4:
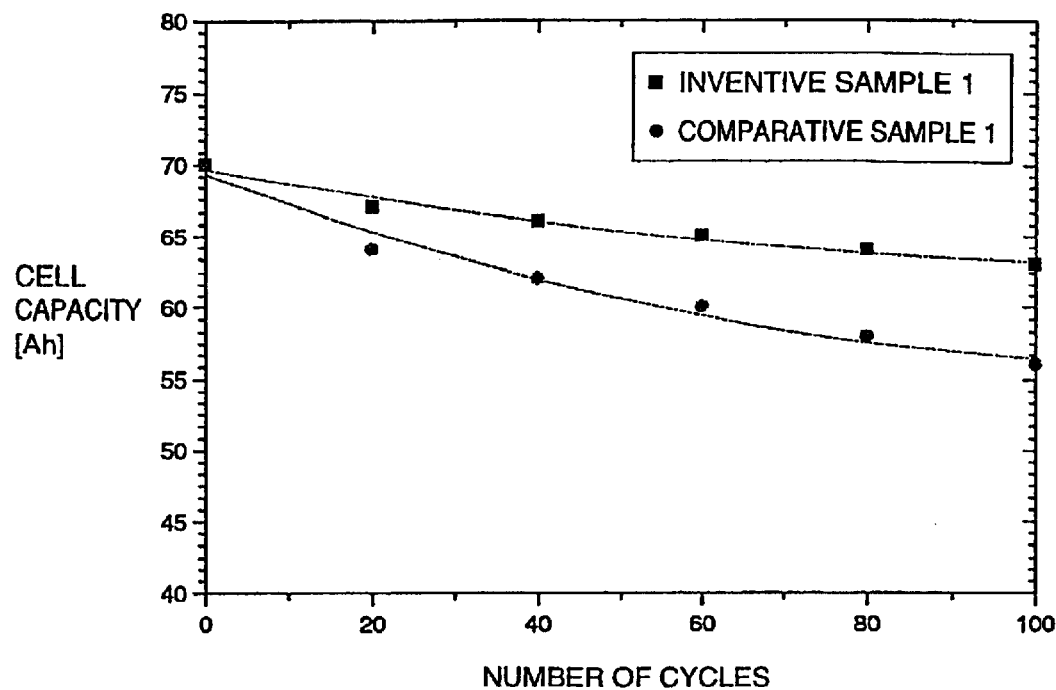
FIG. 4 is a graph showing the charge/discharge cycle property in comparison between Inventive Sample 1 and Comparative Sample 1 differing in the material of the buffer member.

The results are shown in FIG. 4 and the following Table 3. FIG. 4 shows the change in the capacity over the charge/discharge cycle for the battery modules differing in the material of the buffer member. Table 3 shows the cycle property values. The graph of FIG. 4 shows that reduction in the capacity over the charge/discharge cycle was more suppressed for the battery module having the buffer member including metal particles than that formed solely from rubber. It was proved that the mixture of metal particles is effective. Also, it is appreciated from Table 3 that the cycle property value is improved at least 10% by virtue of the buffer member including metal particles.

TABLE 3

|  | Cycle Property Value (initial value = 1) |
|---|---|
| Inventive Sample 1 | 0.9 |
| Comparative Sample 1 | 0.8 |

(Experiment 3)

The relationship between the thickness of the buffer member and the cell property of the battery module was studied. Vibration testing was carried out under the above-described conditions while altering the thickness of the buffer member in the battery module of Inventive Sample 1 of the present embodiment, and a charge/discharge test was carried out under the above-described conditions before and after the vibration test.

Figure 5:
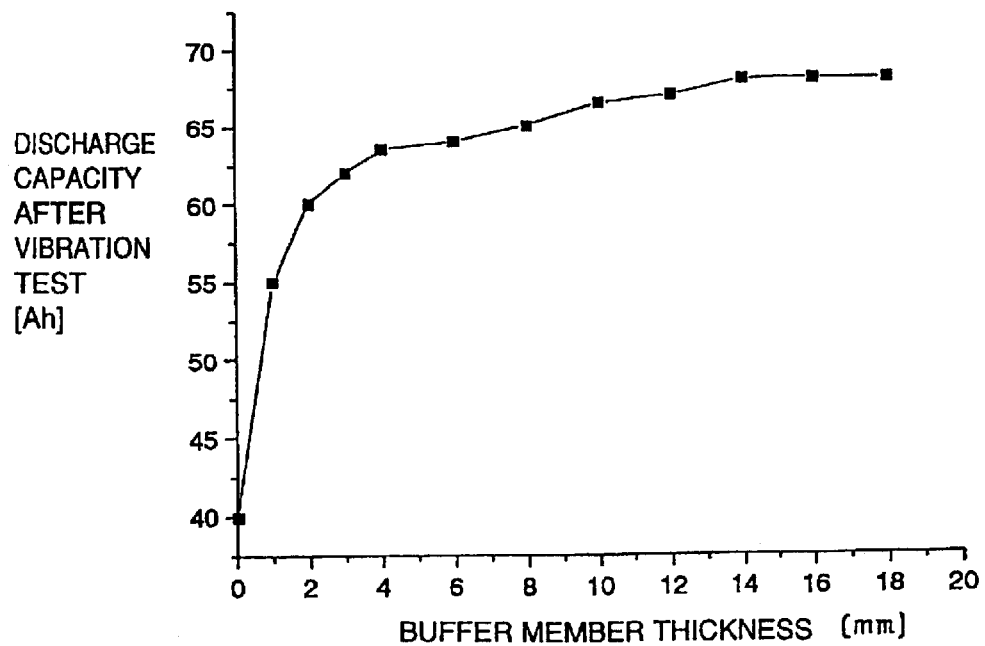
FIG. 5 is a graph showing the discharge capacity after the vibration test of the battery module of Inventive Sample 1 of the present invention with a buffer member of different thickness.

The result is shown in FIG. 5. The graph of FIG. 5 represents the discharge capacity before and after the vibration test for battery modules differing in the thickness of the buffer member. FIG. 5 shows that there is increase in the discharge capacity when the buffer member is 2 mm or thicker. The performance of the battery module was degraded when the buffer member was thinner than 2 mm. The battery module subjected to the experiment was dismantled to detect the cause of performance degradation. It was confirmed that the active material drops off the current collector within the unit cell when the buffer member is thinner than 2 mm. No increase in the discharge capacity was confirmed even when the thickness of the buffer member exceeded 15 mm. It is therefore appreciated that sufficient effect can be achieved with a buffer member of at least 2 mm in thickness from the standpoint of efficiency as a buffer member and not more than 15 mm from the standpoint of improving the energy density of the battery module.

The buffer member formed of rubber including metal particles can be formed in a continuous configuration as shown in FIG. 3, for example, in contrast to the individual provision corresponding to each unit cell. Also, a buffer member having a hole formed to allow electrical connection from a unit cell can be arranged around the unit cell to allow electrical connection by a connection tab arranged around the buffer member.

The shape of the metal particle included in the buffer member is preferably formed of a smooth plane that is advantageous to suppress crack generation which is the basis of crack growth from the standpoint of improving the strength. Further preferably, the metal particle is a sphere.

When the grain size of the metal particles in the buffer member is approximately 50 $\mu$m–100 $\mu$m, a buffer member stable in physical properties can be produced since the metal particles are readily distributed in the rubber.

The raw materials differing in specific gravity must be distributed uniformly in fabricating the buffer member. It is therefore desirable to produce the buffer member by the method of using rubber in the form of powder and metal particles as the materials and mold a buffer member by stirring and mixing the powder of the materials.

As the rubber mixed with metal particles which is the base of the buffer member, styrene rubber such as styrene butadiene rubber, vinyl pyridine styrene butadiene rubber, and styrene isoprene ethylene rubber, vinyl rubber such as butadiene rubber, acrylonitrile butadiene rubber, and ethylene propylene rubber, urethane rubber, acrylic rubber, and also denatured carboxylic acid of the same by dicarboxylic acid vinyl monomer, and hydride can be used solely or in mixture.

The container of the present embodiment does not necessarily have to include the hole for cooling as in the battery module container disclosed in Japanese Patent Laying-Open No. 9-86188. The cost caused by modifying the shape of the container can be suppressed since a battery module identical in shape with a conventional one can be designed. The container of the present embodiment can easily be applied to the current battery module and is superior in compatibility. No impurities will intrude into the battery module, and the performance of the battery module can be maintained favorably.

Second Embodiment

A second embodiment of the present invention will be described hereinafter with reference to FIGS. 6–8.

Figure 6:
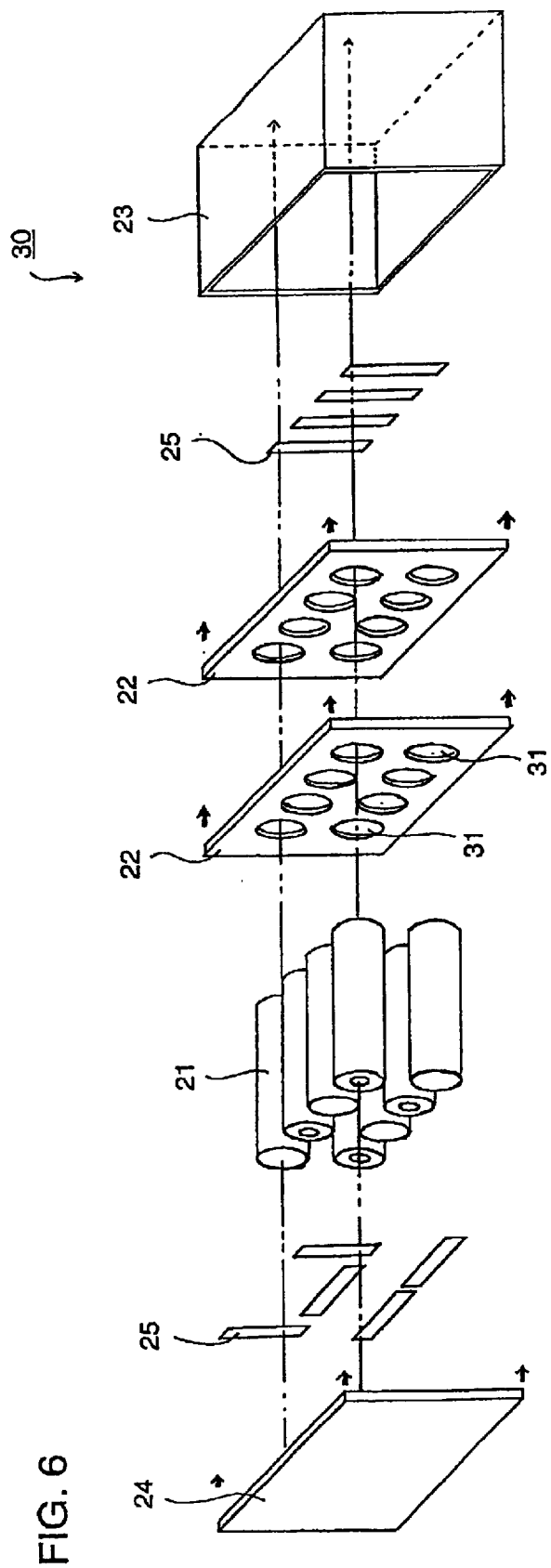
FIG. 6 is an exploded perspective view to describe a structure of a battery module and a container thereof according to a second embodiment of the present invention.

Referring to the exploded perspective view of FIG. 6, the battery module of the second embodiment includes a resin container 23 to accommodate the battery module, two cell secure plates 22 made of metal spaced apart from each other in the horizontal direction of container 23, a plurality (8 in the drawing) of unit cells 21, and a resin lid 24.

A fit and hold portion (not shown) is formed at the inner wall of container 23 to hold respective metal cell secure plates 22 at intermediate locations in the horizontal direction. The fit and hold portion includes a receive stage to receive and hold metal cell secure plate 22 inserted from the lid 24 side (referred to as "left side" hereinafter), and a convex portion sandwiching with the receive stage the end of metal cell secure plate 22 supported at the received stage.

The convex portion is formed of resin. Therefore, the convex portion is deformed elastically when metal cell secure plate 22 inserted from the left side is urged towards the receive stage. Metal cell secure plate 22 is pushed over convex portion to be supported by the receive stage. Metal cell secure plate 22 is sandwiched elastically by the receive stage and the convex portion to be fastened securely.

The fit and hold portion includes a right fit and hold portion for fitting and holding metal secure plate 22 located at the light side and a left fit and hold portion for fitting and holding metal secure plate 22 located at the left side.

A plurality of holes 31 (in the drawing, 8 holes) are formed in cell secure plate 22 to which unit cell 21 is arranged. Unit cell 21 is inserted in hole 31 to be held firmly within container 23.

Each unit cell 21 is connected by a cell connection piece 25. Unit cells 21 are accommodated in the horizontal direction within container 23 in a connected state by cell connection piece 25. Lid 24 is fitted on container 23. Respective one end of a pair of cell connection pieces 25 among the cell connection pieces 25 arranged at the lid 24 side protrudes outside container 23. The protruding portion forms a current lead out terminal 26.

The distance between the left and right metal cell secure plates 22 in container 23 are set to be not more than ⅓ the length of unit cell 21 placed in the horizontal direction in the accommodated state. Metal cell secure plate 22 is formed of a punching metal having a porosity of 30–70%.

Figure 7:
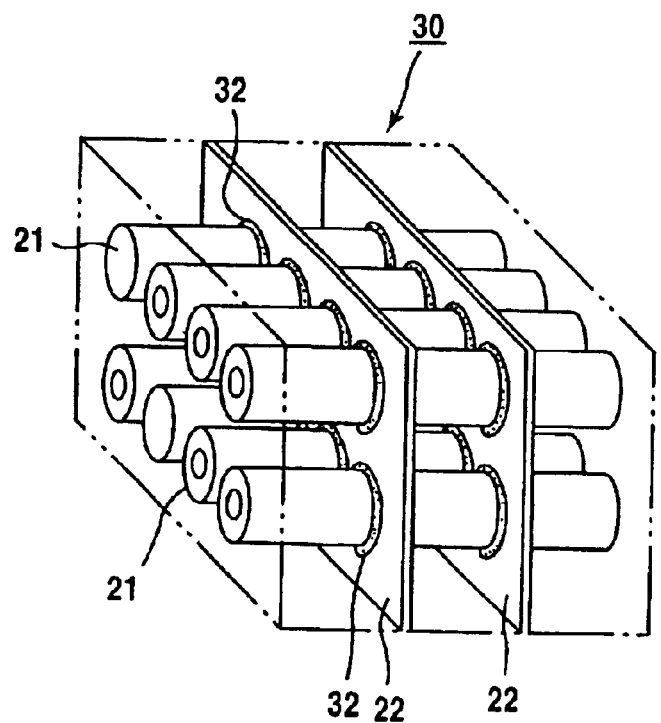
FIG. 7 is a perspective view of a structure of a battery module and a container thereof according to the second embodiment of the present invention.
Figure 8:
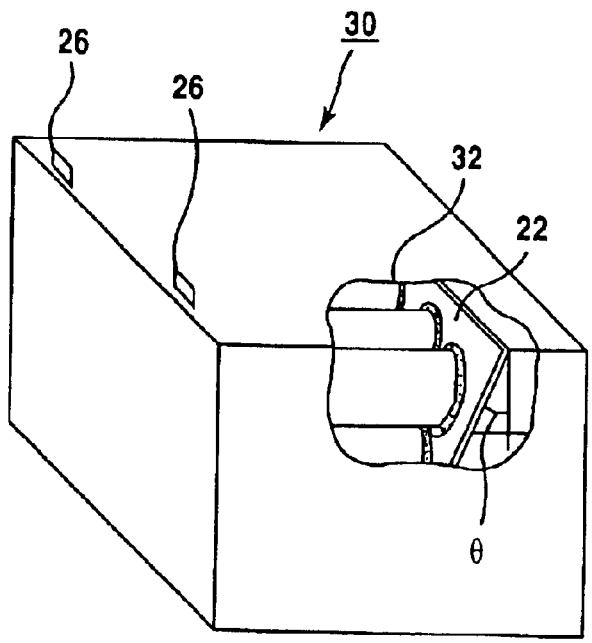
FIG. 8 is a partial broken and perspective view of a modification of the structure of the battery module of the second embodiment.

FIG. 7 shows the completed state of the battery module of the present embodiment, i.e. container 23 with unit cells 21 inserted in metal cell secure plates 22 and sealed with lid 24.

A heat conductive resin 32 is provided between hole 31 in metal cell secure plate 22 and unit cell 21 to hold unit cell 21 firmly in container 23. FIG. 8 is a partial broken perspective view of another example of a battery module. The battery module of FIG. 8 differs from the battery module shown in FIGS. 6 and 7 in that metal secure plate 22 is provided with an inclination of θ with respect to the plane perpendicular to the longitudinal direction of unit cell 21 arranged in the horizontal direction. This inclination angle θ of metal cell secure plate 22 is desirably set variable in a plurality of stages to accommodate the various diameter of the unit cell. The angle of θ is set larger as the generated heat becomes greater under the usage condition of the unit cell to increase the cooling effect.

Fabrication of a unit cell and a battery module will be described hereinafter. Also, the advantageous effect of the present embodiment will be described according to the result of experiments carried out for an inventive sample of the present invention and a comparative sample. In the experiments, the performance was tested for Inventive Samples 2 and 3 and Comparative Samples 2 and 3.

(Fabrication of Inventive Sample 2)

A cathode plate using $LiCoO_2$ as the cathode active material and an anode plate using graphite as the anode active material were wound spirally several times with a porous film made of ion permeable polyolefin therebetween to form an electrode group body. The electrode group was inserted into a battery can together with an ester type organic electrolytic solution including $LiPF_6$ of 1M in concentration as the supporting electrolyte. Thus, a 180 Wh class lithium secondary battery of Φ57×220 mm was produced as unit cell 21.

Eight unit cells 21 produced as described above were arranged and connected in series with each other by cell connection piece 25, and sealed within container 23 with lid 24 fitted. Thus, a battery module 30 with unit cells connected in series was fabricated. Respective unit cells in the battery module was labeled A–D from the left at the upper stage and E–H from the left at the lower stage viewed from the direction of the lid. Four aluminum plates having a thickness of 3 mm with holes in which unit cell 21 are inserted were provided as cell secure plates 22. Respective plates 22 were placed 50 mm apart from each other. Unit cells 21 were secured by aluminum plates 22 in container 23.

(Fabrication of Inventive Sample 3)

The battery module of Inventive Sample 3 was fabricated likewise Inventive Sample 2 with the exception that only two aluminum plates of 3 mm in thickness were installed, placed 70 mm apart from each other.

(Fabrication of Comparative Sample 2)

The battery module of Comparative Sample 2 was fabricated likewise Inventive Sample 2 with the exception that only one aluminum plate of 3 mm in thickness was placed substantially at the center in the longitudinal direction of the unit cell.

(Comparative Sample 3)

The battery module of Comparative Sample 3 was fabricated likewise Inventive Sample 2 with the exception that only one bakelite plate of 5 mm in thickness was placed substantially at the center in the longitudinal direction of the unit cell.

Using the battery modules prepared as described above, the relationship of the number and type of the cell secure plates and the cycle property of the unit cell and the battery temperature was studied. As the experiment, a charge/discharge cycle property test was carried out under the following conditions using the above four types of battery modules differing in the fixture condition of the cells.

As the charge/discharge cycle property test, the battery module was placed in a thermostat of 25° C. The cycle of charging the battery module at 50 A until the voltage of the battery module becomes 32.8V and discharging at 50 A until the voltage of the battery module becomes 21.6V was repeated 500 times. The surface temperature of the unit cell during the 500 cycles of discharge in the charge/discharge cycle was measured. The highest temperature of each unit cell was recorded. The cycle property value is the ratio of the discharge capacity after the 500 cycles to the initial discharge capacity in the charge/discharge cycle.

The result is shown in Tables 4 and 5. Table 4 shows the surface temperature of unit cells A-H of battery modules having different secure conditions, and Table 5 shows the cycle property values of unit cells A–H.

It is appreciated from Table 4 that the surface temperature of the unit cell is lower and variation smaller for the aluminum cell secure plate than the bakelite cell secure plate. Also, the effect becomes more apparent by using a plurality of the cell secure plates.

TABLE 4

|  | Inventive Sample 2 (° C.) | Inventive Sample 3 (° C.) | Comparative Sample 2 (° C.) | Comparative Sample 3 (° C.) |
| --- | --- | --- | --- | --- |
| Unit Cell A | 29.4 | 29.7 | 35.0 | 36.1 |
| Unit Cell B | 29.1 | 29.5 | 34.3 | 35.4 |
| Unit Cell C | 29.0 | 29.4 | 34.1 | 35.2 |
| Unit Cell D | 29.5 | 29.8 | 34.9 | 36.5 |
| Unit Cell E | 30.0 | 30.9 | 37.4 | 39.7 |

TABLE 4-continued

|  | Inventive Sample 2 (° C.) | Inventive Sample 3 (° C.) | Comparative Sample 2 (° C.) | Comparative Sample 3 (° C.) |
|---|---|---|---|---|
| Unit Cell F | 29.6 | 30.2 | 36.8 | 38.1 |
| Unit Cell G | 29.7 | 30.4 | 36.7 | 38.7 |
| Unit Cell H | 30.1 | 30.8 | 37.7 | 39.3 |
| Average | 29.6 | 30.1 | 35.9 | 37.4 |
| Δ max | 1.1 | 1.5 | 3.6 | 4.5 |

It is also appreciated from Table 5 that the remaining capacity of the cell unit is greater and variation smaller for the aluminum secure plate than the bakelite secure plate. The effect becomes more apparent in the case of using a plurality of cell secure plates.

TABLE 5

|  | Inventive Sample 2 (%) | Inventive Sample 3 (%) | Comparative Sample 2 (%) | Comparative Sample 3 (%) |
|---|---|---|---|---|
| Unit Cell A | 81.3 | 84.0 | 74.0 | 71.3 |
| Unit Cell B | 83.0 | 83.6 | 76.5 | 70.2 |
| Unit Cell C | 82.7 | 82.1 | 74.1 | 73.5 |
| Unit Cell D | 81.8 | 82.3 | 72.8 | 76.0 |
| Unit Cell E | 79.5 | 82.0 | 71.0 | 70.0 |
| Unit Cell F | 80.3 | 80.9 | 71.3 | 73.2 |
| Unit Cell G | 83.2 | 80.4 | 75.8 | 71.1 |
| Unit Cell H | 79.9 | 80.0 | 72.1 | 69.8 |
| Average | 81.5 | 81.9 | 73.5 | 71.9 |
| Δ max | 3.7 | 4.0 | 5.5 | 6.2 |

The metal cell secure plate 22 is not limited to the usage of 2 plates. Three or more plates may be used. Also, hole 31 in which the unit cell is inserted is not limited to a circle shape. A rectangular shape or a polygon such as a hexagon is allowed. The direction of inclination of the plurality of cell secure plates 22 is not limited to the same direction as shown in FIG. 3. Cell secure plates 22 may be inclined in an opposite direction. The inclination angle θ of the plurality of cell secure plates 22 is preferably not more than 40% for the sake of sufficient fixture of the cell plate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A battery module container storing a plurality of unit cells in an electrically connected state, comprising a plurality of cell secure plates formed with voids in which said plurality of unit cells are to be inserted for fixedly holding said unit cells within said battery module container when said unit cells are inserted in the voids, wherein said cell secure plates are formed of metal, said unit cells are arranged in a horizontal direction, and said plurality of cell secure plates are provided inclined with respect to a longitudinal direction of the unit cells.

* * * * *